United States Patent Office 3,751,456
Patented Aug. 7, 1973

3,751,456
DISPROPORTIONATION OF AROMATIC
MONOCARBOXYLATES
Yu-Lin Wu, Bartlesville, Okla., assignor to
Phillips Petroleum Company
No Drawing. Filed Mar. 3, 1972, Ser. No. 231,709
Int. Cl. C07c 63/40, 63/32
U.S. Cl. 260—515 P                                4 Claims

ABSTRACT OF THE DISCLOSURE

Alkali metal salts of aromatic tricarboxylic acids are produced by the selective disproportionation of alkali metal salts of aromatic monocarboxylic acids in the presence of a cadmium iodide-sodium iodide catalyst system.

This invention relates to the production of aromatic polycarboxylates having at least three carboxylate groups by the disproportionation of alkali metal salts of aromatic monocarboxylic acids.

It is known in the art that an alkali metal salt of a monocarboxylic acid having a carboxyl group attached to an aromatic ring can be converted, i.e., transformed, into a salt of a carboxylic acid having two carboxyl groups in the molecule by heating the alkali metal salt of the monocarboxylic acid to an elevated temperature. It is also known that this transformation is a solid-state reaction; that is, the alkali metal salt is heated in the solid state to produce the transformation, called disproportionation, wherein the product, which is a mixture low in tricarboxylate content, is also in the solid state.

It is thus an object of this invention to provide an improved disproportionation process for the production of aromatic carboxylic acid salts having at least three carboxylate groups.

Other aspects, objects and the several advantages of the invention will be apparent to one skilled in the art from the following description and the appended claims.

In accordance with this invention, I have discovered that the selective disproportionation of an alkali metal salt of an aromatic carboxylic acid to an aromatic polycarboxylate having two additional carboxylate groups is conveniently effected at a low cadmium iodide catalyst level if there is utilized a catalyst system wherein a portion of the cadmium iodide is replaced with sodium iodide.

The product mixture formed in accordance with the process of this invention gives a mol percent selectivity of aromatic tricarboxylate in the range of 40 to 80 percent. Conversion of aromatic monocarboxylate is approximately 100 percent.

Thus, in one presently preferred embodiment of this invention, a selective disproportionation process is provided for the conversion of an alkali metal salt of an aromatic monocarboxylic acid to an aromatic tricarboxylate wherein an alkali metal salt of a monocarboxylic acid, a cadmium iodide disproportionation catalyst, and a cocatalyst of sodium iodide are subjected to heating at an elevated temperature to produce a high yield of the desired tricarboxylate product.

While the improvements in the process of this invention are readily achieved by the addition of sodium iodide to the conventional cadmium iodide disproportionation catalyst, as a further embodiment of the invention the system can additionally contain at least one compound selected from the group consisting essentially of sodium phenolate, sodium carbonate, sodium cyanate, potassium cyanate, potassium carbonate and urea as a copromoter of the disproportionation reaction. Such copromoters are present in the amount such that the molar ratio of copromoter/NaI is broadly 0.05 to 10, and preferably 0.1 to 5.

The sodium iodide which is used as a replacement for a portion of the cadmium iodide is generally present in an amount such that the molar ratio of $NaI/CdI_2$ is broadly 0.05 to 15, and preferably 0.1 to 10.

When a copromoter is present in the system, such copromoter is utilized in an amount such that the molar ratio of copromoter/$CdI_2$ is broadly 0.05 to 15, and preferably 0.1 to 10.

The amount of total catalyst used can vary within wide limits and can range from 0.1 to 100 grams of catalyst per mol of aromatic monocarboxylate employed, more preferably in the range of 1 to 50 grams per mol. The catalysts can be especially finely divided throughout the reaction mixture by transforming an aqueous solution of the salts serving as the starting materials which contain the catalyst dissolved or suspended therein into a dry powder by spray drying or by other suitable methods. The above-named catalysts can also be used in conjunction with known carriers such as kieselguhr. The catalysts may be used as such or supported on carriers and may be recovered from the insoluble residues of reaction and reused in many instances without further purification.

The conversion of the alkali metal carboxylate is effected substantially completely in the absence of oxygen or water. In general, temperatures in the range of about 350 to 650° C. are employed and more preferably in the range of 450 to 530° C.

The process of this invention can be carried out in an inert atmosphere. Gases which are substantially completely nonreactive to the reaction environment can be employed. Examples of such gases include nitrogen, methane, argon, neon, butane, ethane, helium and the like. In one embodiment of the invention there is utilized an atmosphere which contains, additionally, at least 50 mol percent carbon dioxide. In fact, the higher the partial pressure of carbon dioxide in the atmosphere in which the thermal conversion is carried out, the higher will be the conversion of the initial reactant to the desired product. In addition, carbon monoxide or a mixture of carbon monoxide and carbon dioxide can be used in carrying out the process of the invention.

The materials preferably subjected to disproportionation herein are the alkali metal salts of aromatic monocarboxylic acids, particularly the sodium salt of benzoic acid. Such salts include sodium benzoate, potassium benzoate, lithium benzoate and rubidium benzoate.

In a broader aspect of this invention, as starting materials for the inventive process in addition to the presently preferred alkali metal salts of benzoic acid, the salts of other aromatic monocarboxylic acids can be used. Such salts are those of the formula $RCO_2M$ wherein R is an aromatic or alkaryl group having 6 to 15 carbon atoms and M is an alkali metal. Such salts are readily prepared from the corresponding acids. Such acids include, for example, benzoic acid, 2-naphthalene carboxylic acid, 4-biphenyl carboxylic acid, 2-anthracene carboxylic acid, 3-phenanthrene carboxylic acid, 2,3,4-trimethylbenzene carboxylic acid, p-toluic acid, 4-methyl-2-naphthalene carboxylic acid, 1-naphthalene carboxylic acid, and the like. In all of the above-mentioned carboxylic acid salts, the aromatic ring may carry alkyl radicals in addition to the carboxylic groups provided that these alkyl radical substituents do not bring about a decomposition of the molecule at temperatures equal to or lower than the reaction temperature.

The aromatic monocarboxylic acid salts used as starting materials for the process according to the invention result in the production of reaction products which are industrially valuable alkali metal salts of tricarboxylic acids which can be readily converted to the corresponding tricarboxylic acids; for example, sodium trimesate is readily converted to trimesic acid.

Pressures in the range of 0 to 5000 p.s.i.g. can be employed, but it is advantageous and preferable that lower pressures in the range of 0 to 2000 p.s.i.g. be employed.

Sufficient reaction time should be employed to effect the desired degree of conversion. Generally, reaction times in the range of about 5 minutes to about 48 hours are suitable.

The aromatic polycarboxylates which are produced according to the process of this invention can be recovered from the reaction mixture, which contains a substantial amount of alkali metal tricarboxylate, a small amount of alkali metal dicarboxylate along with a small amount of starting monocarboxylate and trace amounts of other salts, by dissolving the mixture in hot water. The insoluble carbonaceous materials and catalysts are filtered out. The resulting filtrate is heated to a temperature in the range of 70 to 100° C. and acidified with a mineral acid such as hydrochloric acid, sulfuric acid or nitric acid to precipitate dicarboxylic acid. The dicarboxylic acid is removed and the remaining solution is cooled in an ice bath to precipitate the desired tricarboxylic acid product and monocarboxylic acid. The solution which remains contains impurities. The precipitate from the cooled solution is extracted with chloroform wherein the monocarboxylic acid is dissolved and the desired tricarboxylic acid remains in the undissolved state.

The following example will enable persons skilled in the art better to understand and practice the invention. However, the example is not intended to limit the scope of the invention.

EXAMPLE

A series of runs were carried out to produce sodium trimesate by the thermal disproportionation of sodium benzoate in a solid-state reaction using the catalyst-promoter system as indicated in the table below. The reaction temperature was maintained at 503° C., with the reaction being conducted in the presence of carbon dioxide gas at 300 p.s.i.g. The following results were obtained:

| Run No. | Grams | | | Mol percent | | | |
|---|---|---|---|---|---|---|---|
| | CdI$_2$ | NaI | Na$_2$CO$_3$ | Conv. | Select., TPA[a] | Select., TMA[b] | Yield, TMA |
| 1 | 0.80 | -------- | 0.40 | 100 | 9 | 73 | 73 |
| 2 | 0.40 | 0.40 | 0.40 | 98 | 8 | 76 | 74 |

[a] Terephthalic acid.
[b] Trimesic acid.

From the above data, it can be seen that conversion of sodium benzoate to trimesic acid (sodium trimesate) is effected in high conversions with high selectivity but at lower cadmium iodide level if sodium iodide is employed in combination with the cadmium catalyst.

In the above example, conversion, selectivity, and yield data are based upon the following formulas:

Percent conversion $$= \frac{\text{mols sodium benzoate charged} - \text{mols sodium benzoate recovered}}{\text{mols sodium benzoate charged}} \times 100$$

Percent selectivity (diacid)

$$= \frac{\text{mols diacid produced} \times 2}{\text{mols sodium benzoate converted}} \times 100$$

Percent selectivity (triacid)

$$= \frac{\text{mols triacid produced} \times 3}{\text{mols sodium benzoate converted}} \times 100$$

Percent yield = percent conversion × percent selectivity

Reasonable variations and modifications are possible within the foregoing specification without departing from the spirit and scope thereof.

I claim:
1. In a disproportionation process for the conversion of an alkali metal salt of an aromatic carboxylic acid to an aromatic polycarboxylate containing at least two additional carboxyl groups which comprises heating said alkali metal salt in the presence of a disproportionation catalyst under disproportionation conditions, the improvement which comprises using as said disproportionation catalyst a mixture of cadmium iodide and sodium iodide.

2. A process according to claim 1 wherein said cadmium iodide and sodium iodide are present in an amount such that the molar ratio of sodium iodide to cadmium iodide is in the range of 0.05 to 15.

3. A process according to claim 1 wherein there is additionally present in the catalyst system at least one copromoter selected from the group consisting of sodium phenolate, sodium carbonate, sodium cyanate, potassium cyanate, potassium carbonate and urea, said copromoter being present in an amount such that the molar ratio of copromoter to sodium iodide is in the range of 0.05 to 10.0 and the molar ratio of copromoter to cadmium iodide is in the range of 0.05 to 15.

4. A process according to claim 1 wherein said alkali metal salt of aromatic carboxylic acid is sodium benzoate and said aromatic polycarboxylate is sodium trimesate.

References Cited

Sherwood, Chemistry and Industry (Aug. 27, 1960), pp. 1096–1100.

JAMES A. PATTEN, Primary Examiner

U.S. Cl. X.R.

252—475